United States Patent
Fan et al.

(10) Patent No.: US 10,380,443 B2
(45) Date of Patent: Aug. 13, 2019

(54) LIVENESS DETECTION METHOD, LIVENESS DETECTION SYSTEM, AND COMPUTER PROGRAM PRODUCT

(71) Applicants: BEIJING KUANGSHI TECHNOLOGY CO., LTD., Beijing (CN); PINHOLE (BEIJING) TECHNOLOGY CO., LTD., Beijing (CN)

(72) Inventors: Haoqiang Fan, Beijing (CN); Qi Yin, Beijing (CN)

(73) Assignees: BEIJING KUANGSHI TECHNOLOGY CO., LTD., Beijing (CN); PINHOLE (BEIJING) TECHNOLOGY CO., LTD., Beijing (CN)

( * ) Notice: Subject to any disclaimer, the term of this patent is extended or adjusted under 35 U.S.C. 154(b) by 266 days.

(21) Appl. No.: 15/411,036

(22) Filed: Jan. 20, 2017

(65) Prior Publication Data
US 2017/0286788 A1    Oct. 5, 2017

(30) Foreign Application Priority Data
Apr. 1, 2016    (CN) .......................... 2016 1 0203579

(51) Int. Cl.
H04L 29/06    (2006.01)
G06K 9/00    (2006.01)
(Continued)

(52) U.S. Cl.
CPC ..... *G06K 9/00906* (2013.01); *G06K 9/00255* (2013.01); *G06K 9/00281* (2013.01);
(Continued)

(58) Field of Classification Search
CPC .......... G06K 9/00906; G06K 9/00255; G06K 9/6256; G06K 9/522; G06K 9/4661;
(Continued)

(56) References Cited

U.S. PATENT DOCUMENTS 5,077,803 A    12/1991    Kato et al.
2008/0152198 A1    6/2008    Tsukahara
(Continued)

FOREIGN PATENT DOCUMENTS

CN    1842296    10/2006
CN    105138996    12/2015
(Continued)

OTHER PUBLICATIONS

Azim Zaliha Abd Azizetal., • Face anti-spoofing countermeasure: Efficient 2D materials classification using polarization imaging, Published 2017 in 2017 5th International Workshop on Biometrics and . . . • DOI: 10.1109/IWBF.2017.7935105. (Year: 2017).*
(Continued)

*Primary Examiner* — Howard D Brown, Jr.
(74) *Attorney, Agent, or Firm* — Hamre, Schumann, Mueller & Larson, P.C.

(57) ABSTRACT

The application provides a liveness detection method capable of implementing liveness detection, and a liveness detection system that employs the liveness detection method. The liveness detection method comprises: irradiating an object to be detected with structured light; obtaining first facial image data of the object to be detected under irradiation of the structured light; determining, based on the first facial image data, a detection parameter that indicates a sub-surface scattering intensity of the structured light on a face of the object to be detected; and determining, based on the detection parameter and a predetermined parameter threshold, whether the object to be detected is a living body.

12 Claims, 6 Drawing Sheets

(51) Int. Cl.
*G06K 9/20* (2006.01)
*G06K 9/46* (2006.01)
*G06K 9/52* (2006.01)
*G06K 9/62* (2006.01)

(52) U.S. Cl.
CPC ....... *G06K 9/00288* (2013.01); *G06K 9/2027* (2013.01); *G06K 9/4661* (2013.01); *G06K 9/522* (2013.01); *G06K 9/6256* (2013.01); *G06K 2009/4666* (2013.01)

(58) Field of Classification Search
CPC ............. G06K 9/2027; G06K 9/00288; G06K 9/00281; G06K 2009/4666
See application file for complete search history.

(56) References Cited

U.S. PATENT DOCUMENTS

| | | | | |
|---|---|---|---|---|
| 2008/0159468 A1* | 7/2008 | Chong | ................. | A61B 5/0066 378/4 |
| 2009/0016574 A1* | 1/2009 | Tsukahara | .............. | A61B 5/117 382/117 |
| 2010/0082019 A1* | 4/2010 | Neev | ................... | A61B 18/203 606/9 |
| 2012/0316820 A1* | 12/2012 | Nakazato | ............... | G01B 11/25 702/94 |
| 2013/0202182 A1* | 8/2013 | Rowe | ..................... | A61B 10/02 382/133 |
| 2016/0277397 A1* | 9/2016 | Watanabe | ........... | G06F 16/5838 |
| 2016/0331991 A1* | 11/2016 | Kirenko | .................... | A61N 5/06 |
| 2016/0371555 A1* | 12/2016 | Derakhshani | ........... | G01S 7/539 |
| 2017/0061251 A1 | 3/2017 | Fan et al. | | |
| 2018/0089483 A1* | 3/2018 | Norimatsu | ................ | G06T 7/00 |
| 2018/0089484 A1* | 3/2018 | Satou | ..................... | A61B 5/117 |
| 2018/0165512 A1 | 6/2018 | Fan | | |
| 2018/0220939 A1* | 8/2018 | Matsuo | ..................... | G06T 7/00 |

FOREIGN PATENT DOCUMENTS

| | | |
|---|---|---|
| CN | 105184246 | 12/2015 |
| CN | 105243376 | 1/2016 |
| CN | 105637532 | 6/2016 |

OTHER PUBLICATIONS

Jiangwei Li, Yunhong Wang, Tieniu Tan, Anil K. Jain, "Live face detection based on the analysis of Fourier spectra," Proc. SPIE 5404, Biometric Technology for Human Identification, (Aug. 25, 2004); (Year: 2004).*

First Chinese Office Action, issued in the corresponding Chinese patent application No. 201610203579.0, dated Nov. 23, 2018, 20 pages.

\* cited by examiner

LIVENESS DETECTION METHOD, LIVENESS DETECTION SYSTEM, AND COMPUTER PROGRAM PRODUCT

CROSS-REFERENCE TO RELATED APPLICATION

The present application claims the priority of Chinese patent application No. 201610203579.0 filed on Apr. 1, 2016, the disclosure of which is incorporated herein by reference in its entirety.

TECHNICAL FIELD

The present disclosure relates to the field of liveness detection, and more particularly, to a liveness detection method, a liveness detection system, and a computer program product that are capable of implementing liveness detection.

BACKGROUND

At present, face recognition systems are more and more frequently applied to scenarios that require an ID authentication in fields like security, finance etc., such as remote bank account opening system, access control system, remote transaction operating verification system, etc. In these application fields with high security level, in addition to ensuring that a face similarity of a person to be verified matches with library data stored in a database, first of all, it needs that the person to be verified is a legitimate biological living body. That is to say, the face recognition system needs to be able to prevent an attacker from attacking using pictures, 3D face models, or masks and so on.

The method for solving the above problem is usually called liveness detection, which aims to determine whether an obtained biological feature comes from a living, in-field, real person. Mature liveness verification schemes have not existed among technology products on market yet, conventional liveness detection techniques either depend on specific hardware devices, such as image acquisition devices like infrared camera, depth camera or complex active light sources like DLP projector, or can prevent only simple attacks from static pictures. In addition, most of the liveness detection systems existing in the prior art are cooperated-style, i.e., requiring a person being tested to make a corresponding action or stay still in place for a period of time according to an instruction from the systems, however it affects user's experience and efficiency of liveness detection.

SUMMARY

In view of the above problem, the present disclosure is proposed. The present disclosure provides a liveness detection method capable of implementing liveness detection, and a liveness detection system that employs the liveness detection method, wherein a static structured light source is used to detect whether it is a face of a living body or an attacker such as 3D face model or mask based on sub-surface scattering of a face relative to the structured light, lower cooperation is required from the user, accuracy of the face recognition systems, usability, and user experience are all improved.

According to an embodiment of the present disclosure, there is provided a liveness detection method, comprising: irradiating an object to be detected with structured light; obtaining first facial image data of the object to be detected under irradiation of the structured light; determining, based on the first facial image data, a detection parameter that indicates a sub-surface scattering intensity of the structured light on a face of the object to be detected; and determining, based on the detection parameter and a predetermined parameter threshold, whether the object to be detected is a living body.

In addition, the liveness detection method according to an embodiment of the present disclosure further comprises: prior to irradiating an object to be detected with structured light, continuously capturing a monitoring image of the object to be detected; detecting, by a face detecting unit that is trained in advance, the monitoring image to obtain a monitoring result; when the monitoring result indicates that there is a facial image in the monitoring image, turning on a structured light source of to emit the structured light for irradiating the object to be detected.

In addition, in the liveness detection method according to an embodiment of the present disclosure, wherein the detection parameter is a ratio of a sum of gradient magnitudes of the first facial image data within a predetermined region to a total brightness value of the image within the predetermined region.

In addition, the liveness detection method according to an embodiment of the present disclosure further comprises: determining a plurality of predetermined facial key points on the first facial image data by a facial key point detecting unit that is trained in advance, and determining the predetermined region according to the plurality of predetermined facial key points.

In addition, in the liveness detection method according to an embodiment of the present disclosure, wherein determining, based on the first facial image data, a detection parameter that indicates a sub-surface scattering intensity of the structured light on a face of the object to be detected comprises: dividing the first facial image data into a plurality of sub-image regions; performing Fourier transform on sub-image data of each sub-image region to obtain a sub-image Fourier transform coefficient of each sub-image region; as for each sub-image region, calculating a ratio of sum of squares of the sub-image Fourier transform coefficient within a predetermined frequency range to a square of a sub-image Fourier transform lowest frequency coefficient; and calculating an average of the ratios in the plurality of sub-image regions as the detection parameter.

In addition, in the liveness detection method according to an embodiment of the present disclosure, wherein determining, based on the detection parameter and a predetermined parameter threshold, whether the object to be detected is a living body comprises: if the detection parameter is larger than a first parameter threshold and smaller than a second parameter threshold, determining that the object to be detected passes the liveness detection; otherwise, determining that the object to be detected fails the liveness detection.

According to another embodiment of the present disclosure, there is provided a liveness detection system, comprising: a structured light source module of structured light for emitting structured light to irradiate an object to be detected; an image data obtaining module for obtaining first facial image data of the object to be detected under irradiation of the structured light; and a liveness detecting module for determining, based on the first facial image data, a detection parameter that indicates a sub-surface scattering intensity of the structured light on a face of the object to be detected, and determining, based on the detection parameter and a predetermined parameter threshold, whether the object to be detected is a living body.

In addition, in the liveness detection system according to another embodiment of the present disclosure, wherein prior to the structured light source module emits structured light to irradiate an object to be detected, the image data obtaining module continuously captures a monitoring image of the object to be detected; the liveness detecting module detects, by a face detecting unit that is trained in advance, the monitoring image to obtain a monitoring result; when the monitoring result indicates that there is a facial image in the monitoring image, the liveness detecting module controls to turn on the structured light source module to emit the structured light for irradiating the object to be detected.

In addition, in the liveness detection system according to another embodiment of the present disclosure, wherein the detection parameter is a ratio of a sum of gradient magnitudes of the first facial image data within a predetermined region to a total brightness value of the image within the predetermined region.

In addition, in the liveness detection system according to another embodiment of the present disclosure, wherein the liveness detecting module determines a plurality of predetermined facial key points on the first facial image data by a facial key point detecting unit that is trained in advance and determines the predetermined region according to the plurality of predetermined facial key points.

In addition, in the liveness detection system according to another embodiment of the present disclosure, wherein the liveness detecting module divides the first facial image data into a plurality of sub-image regions; performs Fourier transform on sub-image data of each sub-image region to obtain a sub-image Fourier transform coefficient of each sub-image region; as for each sub-image region, calculates a ratio of a sum of squares of the sub-image Fourier transform coefficient within a predetermined frequency range to a square of a sub-image Fourier transform lowest frequency coefficient; and calculates an average of the ratios in the plurality of sub-image regions as the detection parameter.

In addition, in the liveness detection system according to another embodiment of the present disclosure, wherein if the detection parameter is larger than a first parameter threshold and smaller than a second parameter threshold, the liveness detecting module determines that the object to be detected passes the liveness detection; otherwise, the liveness detecting module determines that the object to be detected fails the liveness detection.

According to yet another embodiment of the present disclosure, there is provided a computer program product, comprising a computer-readable medium on which computer program instructions configured to execute the following steps when being run by a computer: obtaining first facial image data of the object to be detected under irradiation of the structured light; determining, based on the first facial image data, a detection parameter that indicates a sub-surface scattering intensity of the structured light on a face of the object to be detected; and determining, based on the detection parameter and a predetermined parameter threshold, whether the object to be detected is a living body.

It is to be understood that both the foregoing general descriptions and the following detailed descriptions are exemplary and intended to provide further explanations of the claimed technique.

BRIEF DESCRIPTION OF THE DRAWINGS

Through the more detailed description of embodiments of the present disclosure with reference to the accompanying drawings, the above and other objectives, features, and advantages of the present disclosure will become more apparent. The drawings are to provide further understanding for the embodiments of the present disclosure and constitute a portion of the specification, and are intended to interpret the present disclosure together with the embodiments rather than to limit the present disclosure. In the drawings, the same reference sign generally refers to the same component or step.

DETAILED DESCRIPTION OF THE EMBODIMENTS

To make the objectives, technical solutions, and advantages of the present disclosure more clear, exemplary embodiments of the present disclosure will be described in detail with reference to the accompanying drawings. Obviously, the described embodiments merely are a part of the embodiments of the present disclosure, rather than all of the embodiments of the present disclosure, it should be understood that the present disclosure is not limited to the exemplary embodiments described herein. All other embodiments obtained by those skilled in the art without paying creative efforts should all fall into the protection scope of the present disclosure.

Hereinafter, preferred embodiments of the present disclosure will be described in detail with reference to the accompanying drawings.

Figure 1:
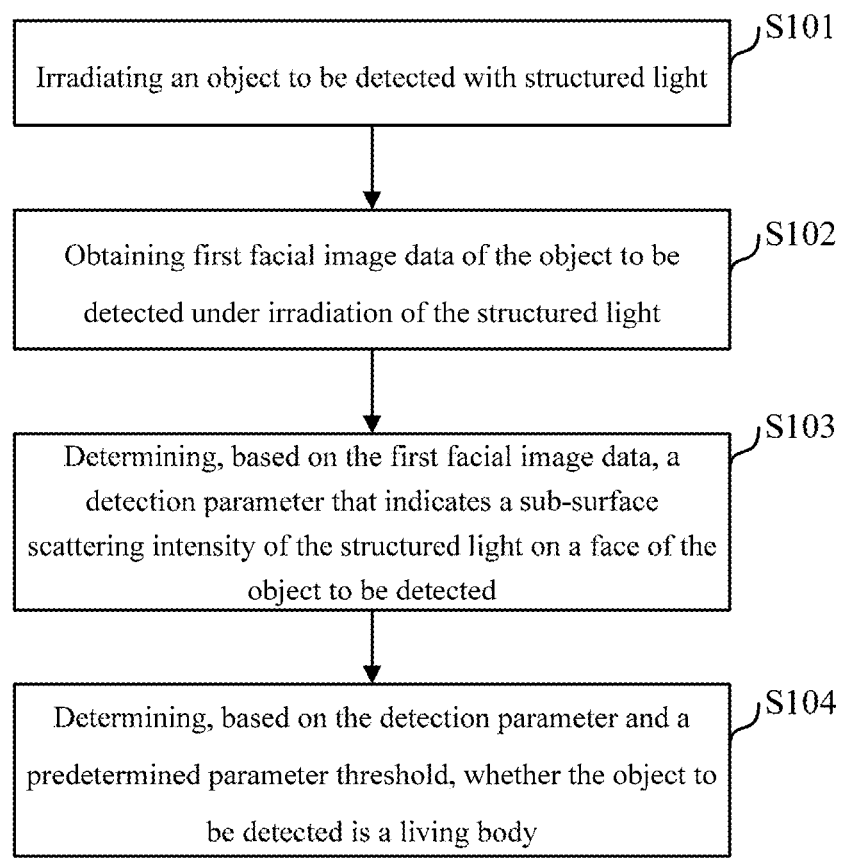
FIG. 1 is a flowchart briefly illustrating the liveness detection method according to an embodiment of the present disclosure.

FIG. 1 is a flowchart briefly illustrating the liveness detection method according to an embodiment of the present disclosure. As shown in FIG. 1, the liveness detection method according to an embodiment of the present disclosure comprises the following steps.

In step S101, an object to be detected is irradiated with structured light.

In an embodiment of the present disclosure, the structured light is light having light and dark stripes with a certain structure on a wavelength such as infrared wave band (e.g., 850 nm). The light and dark stripes are vertical stripes, a stripe pitch is configured to match a size of the object to be detected. For example, in a case where the object to be detected is a human face, the stripe pitch of the light and dark stripes is about 2 mm. In an embodiment of the present application, the structured light may be generated by placing a specific grating (e.g., 161 lines/inch) before a line laser.

In addition, as will be described in detail below with reference to the drawings, in the liveness detection method according to an embodiment of the present disclosure, there is no need to always irradiate a detection region with the structured light, instead, a structured light source module is turned on after a facial image is preliminarily detected in the detection area.

Thereafter, the process proceeds to step S102.

In step S102, first facial image data of the object to be detected under irradiation of the structured light is obtained. In an embodiment of the present disclosure, first facial image data of the object to be detected under irradiation of the structured light is obtained by an image data obtaining module. Obtaining first facial image data of the object to be detected by an image data obtaining module comprises, but not limited to, after facial image data under irradiation of the structured light is acquired by an image data obtaining module that is configured separately with the structured light source module in terms of physical position, first facial image data transmitted from the image data obtaining module is received by other modules or components in the liveness detection system in a wired or wireless manner. Alternatively, the image data obtaining module may be physically located on the same position or even within the same housing together with other modules or components in the liveness detection system, the other modules or components in the liveness detection system receive the first facial image data transmitted by the image data obtaining module via an internal bus.

Thereafter, the process proceeds to step S103.

In step S103, a detection parameter that indicates a sub-surface scattering intensity of the structured light on a face of the object to be detected is determined based on the first facial image data. In an embodiment of the present disclosure, liveness detection is executed by using a detection parameter that indicates a sub-surface scattering intensity of the structured light on a face of the object to be detected. This is because after the structured light enters a surface of the object to be detected, an internal structure of the object to be detected decides a scattering intensity after the incident structured light scatters through interior of the object to be detected. A living tissue of a human being, paper or silicone that constitutes a mask show different sub-surface scattering intensities with respect to the incident structured light. As will be described in detail below with reference to the drawings, in an embodiment of the present disclosure, a ratio of a sum of gradient magnitudes of the first facial image data within a predetermined region to a total brightness value of the image within the predetermined region is taken as the detection parameter that indicates a sub-surface scattering intensity of the structured light on a face of the object to be detected. Alternatively, in an embodiment of the present disclosure, the first facial image data is divided into a plurality of sub-image regions, Fourier transform is performed on sub-image data of each sub-image region to obtain a sub-image Fourier transform coefficient of each sub-image region, as for each sub-image region, a ratio of a sum of squares of the sub-image Fourier transform coefficient within a predetermined frequency range to a square of a sub-image Fourier transform lowest frequency coefficient is calculated, and an average of the ratios in the plurality of sub-image regions is calculated as the detection parameter.

Thereafter, the process proceeds to step S104.

In step S104, whether the object to be detected is a living body is determined based on the detection parameter and a predetermined parameter threshold. In an embodiment of the present disclosure, the parameter threshold is set according to sub-surface scattering properties of a living tissue of a human being relative to the incident structured light. As will be described in detail below with reference to the drawings, the set parameter threshold may be a threshold interval, when the detection parameter obtained in step S103 falls into the threshold range, then it is determined that the object to be detected is a living body.

The liveness detection method according to an embodiment of the present disclosure as described above can perform liveness detection by utilizing a static structured light source to detect whether it is a face of a living body or an attacker such as 3D face model or mask based on sub-surface scattering of a face relative to the structured light, therefore, lower cooperation is required from the user, accuracy of the face recognition systems, usability, and user experience are all improved.

Hereinafter, a liveness detection system that executes the above liveness detection method will be further described with reference to FIG. 2.

Figure 2:
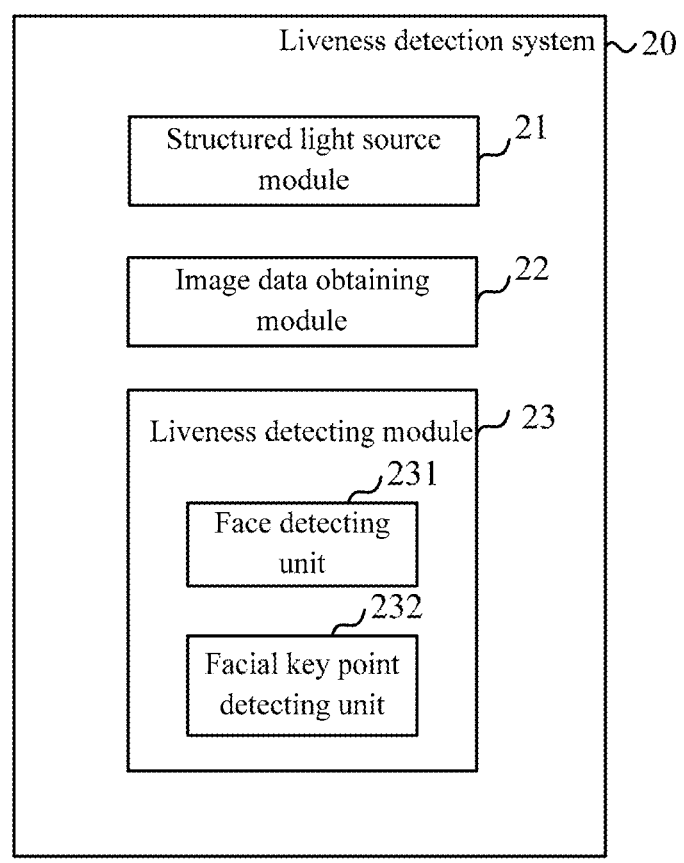
FIG. 2 is a functional block diagram illustrating the liveness detection system according to an embodiment of the present disclosure.

FIG. 2 is a functional block diagram illustrating the liveness detection system according to an embodiment of the present disclosure. As shown in FIG. 2, the liveness detection system 20 according to an embodiment of the present disclosure comprises a structured light source module 21, an image data obtaining module 22, and a liveness detecting module 23. The liveness detecting module 23 further includes a face detecting unit 231 and a facial key point detecting unit 232.

Specifically, the structured light source module 21 is for emitting structured light to irradiate an object to be detected. As described above, the light structured source module 21 may be configured by placing specific grating (e.g., 161 lines/inch) before a line laser. Such configured structured light source module 21 can emit light having light and dark stripes with a certain structure on a wavelength such as infrared wave band (e.g., 850 nm). The light and dark stripes are vertical stripes, a stripe pitch is configured to match a size of the object to be detected. For example, in a case where the object to be detected is a human face, the stripe pitch of the light and dark stripes is about 2 mm.

The image data obtaining module 22 is for obtaining first facial image data of the object to be detected under irradiation of the structured light. As described above, the image data obtaining module 22 may be physically separated from the liveness detecting module 23, or may be physically located on the same position or within the same housing together with the liveness detecting module 23 that is provided subsequently. In the case where the image data obtaining module 22 is physically separated from the liveness detecting module 23, the image data obtaining module 22 further transmits, in a wired or wireless manner, the obtained first facial image data to the modules that are described subsequently. In the case where the image data obtaining module 22 is physically located on the same position or within the same housing together with the liveness detecting module 23 that is described subsequently, the image data obtaining module 22 further transmits, via an internal bus, the obtained first facial image data to the modules that are described subsequently. Prior to transmitting the first facial image data in a wired or wireless manner or via a bus, the first facial image data may be encoded with a predetermined format and compressed as an image data packet, so as to reduce traffic and bandwidth that are required by the transmission.

The liveness detecting module 23 is for determining, based on the first facial image data, a detection parameter that indicates a sub-surface scattering intensity of the structured light on a face of the object to be detected, and determining, based on the detection parameter and a predetermined parameter threshold, whether the object to be detected is a living body.

As described above, in the liveness detection method according to an embodiment of the present disclosure, there is no need to always irradiate a detection region with the structured light, instead, the structured light source module 21 is turned on after a facial image is preliminarily detected in the detection area. The face detecting unit 231 included in the liveness detecting module 23 is for preliminarily detecting whether there is a facial image in the detection region. In an embodiment of the present application, prior to the structured light source module 21 emits structured light to irradiate an object to be detected, the image data obtaining module 22 continuously captures a monitoring image of the object to be detected, the liveness detecting module 23 detects, by the face detecting unit 231 that is trained in advance, the monitoring image to obtain a monitoring result. For example, the face detecting unit 231 may be configured with a Haar cascade classifier. When the monitoring result indicates that there is a facial image in the monitoring image, the liveness detecting module 23 controls to turn on the structured light source module 21 to emit the structured light for irradiating the object to be detected.

In addition, in an embodiment of the present disclosure, the liveness detecting module 23 uses a ratio of a sum of gradient magnitudes of the first facial image data within a predetermined region to a total brightness value of the image within the predetermined region as the detection parameter. Specifically, the facial key point detecting unit 232 included in the liveness detecting module 23 is for determining a plurality of predetermined facial key points on the first facial image data, and determining the predetermined region according to the plurality of predetermined facial key points. For example, the facial key point detecting unit 232 may be configured with a convolution neural network, to obtain key points such as eyes, nose, mouth, contour etc. In the below, determination of the predetermined region based on the key points, and the detection process that a ratio of a sum of gradient magnitudes of the first facial image data within a predetermined region to a total brightness of the image value within the predetermined region is taken as the detection parameter will be described in further detail with reference to the schematic diagrams and the flowcharts.

Figure 3A:
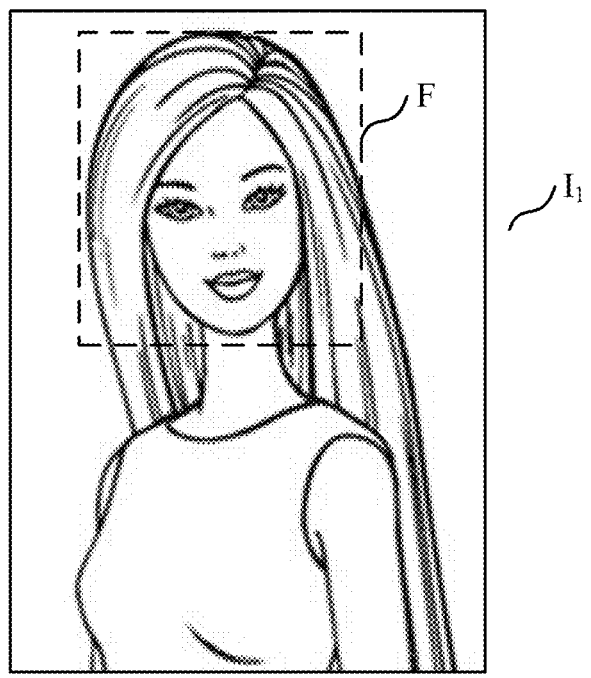
FIGS. 3A and 3B are schematic block diagrams schematically illustrating the liveness detection process according to an embodiment of the present disclosure.
Figure 3B:
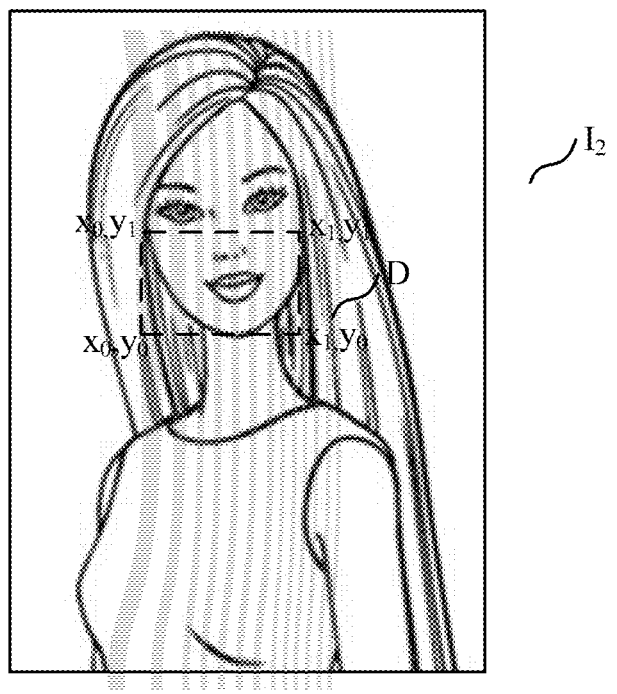

FIGS. 3A and 3B are schematic block diagrams schematically illustrating the liveness detection process according to an embodiment of the present disclosure.

As shown in FIG. 3A, prior to irradiating an object to be detected with structured light, a monitoring image of the object to be detected is continuously captured. Meanwhile, the monitoring image is detected by the face detecting unit 231 that is trained in advance, to obtain a monitoring result. When the monitoring result indicates that there is a facial image F (corresponding to the facial image data $I_1$) in the monitoring image, the light structured source module 21 is turned on to emit the structured light for irradiating the object to be detected.

As shown in FIG. 3B, after irradiating an object to be detected with structured light, the image data obtaining module 22 obtains first facial image data $I_2$ of the object to be detected under irradiation of the structured light. In order to determine the detection parameter that indicates a subsurface scattering intensity of the structured light on a face of the object to be detected, the facial key point detecting unit 232 that is trained in advance is used to determine a plurality of predetermined facial key points on the first facial image data, and determine the predetermined region D according to the plurality of predetermined facial key point. As shown in FIG. 3B, a rectangle region is determined as the predetermined region D based on the key points (as shown by the region D represented with dashed lines in FIG. 3B). In an embodiment of the present disclosure, the predetermined region D (x, y) is within the range of $x_0 \leq x \leq x_1$, $y_0 \leq y \leq y_1$, wherein $x_0$, $x_1$ are horizontal coordinates of leftmost and rightmost sites of the face on the image, respectively, $y_0$ is a vertical coordinate of the lowest site on the face, and $y_1$ is vertical coordinates of sites of a center between two eyes and a midpoint of the nose, as will be readily appreciated, selection of the predetermined region is not limited to this.

Next, the liveness detection method according to the first and the second embodiments of the present disclosure will be further described in detail below with reference to FIGS. 4 and 5, respectively.

Figure 4:
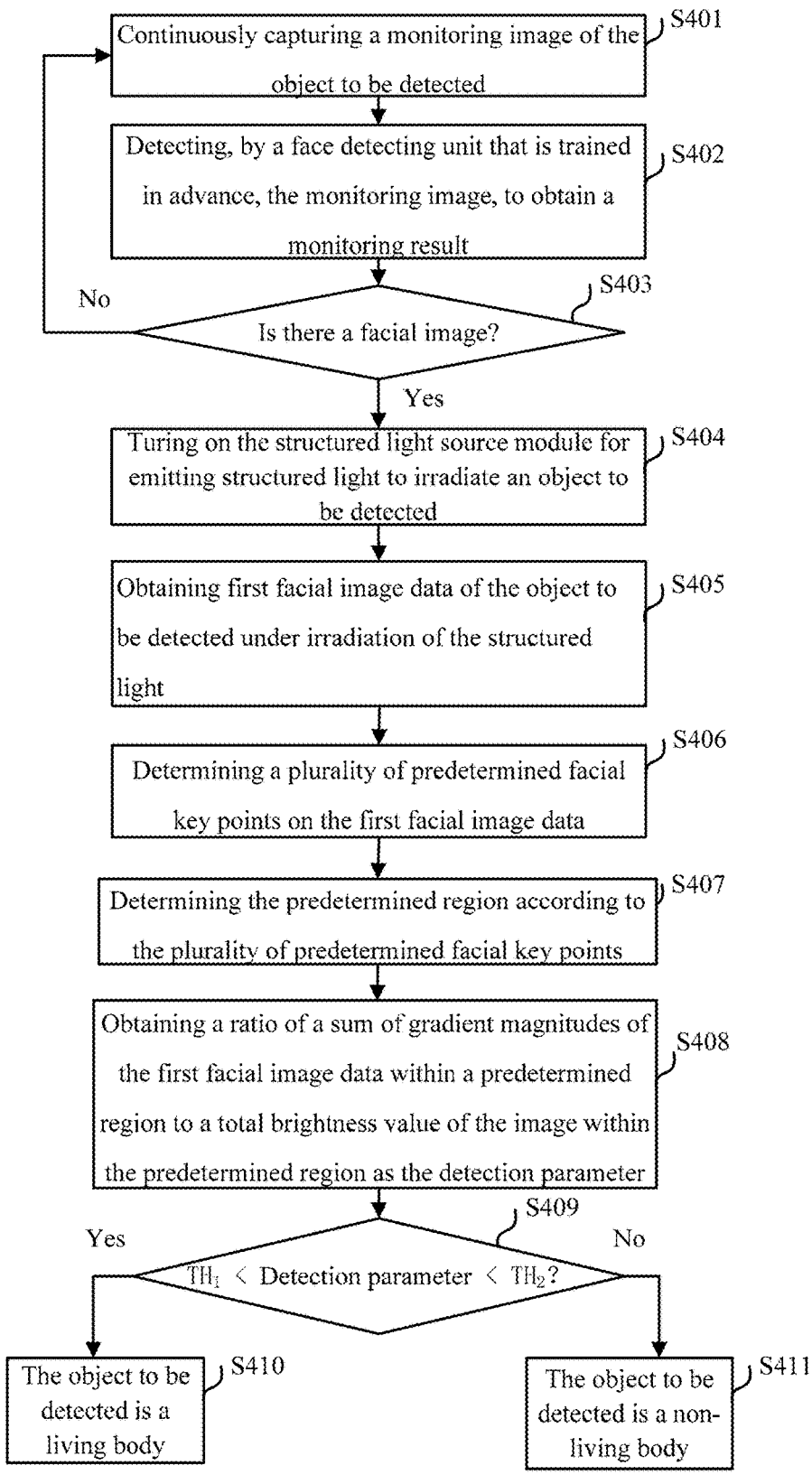
FIG. 4 is a flowchart further illustrating the liveness detection method according to a first embodiment of the present disclosure.

FIG. 4 is a flowchart further illustrating the liveness detection method according to a first embodiment of the present disclosure. As shown in FIG. 4, the liveness detection method according to the first embodiment of the present disclosure comprises the following steps.

In step S401, a monitoring image of the object to be detected is continuously captured. In the first embodiment of the present disclosure, before turning on the structured light source module 21, the image data obtaining module 22 continuously captures monitoring image of the object to be detected. Thereafter, the process proceeds to step S402.

In step S402, the monitoring image is detected by a face detecting unit that is trained in advance, to obtain a monitoring result. In the first embodiment of the present disclosure, the face detecting unit 231 included in the liveness detecting module 23 monitors the image data captured in step S401 to obtain a monitoring result indicates whether there is a facial image therein. Thereafter, the process proceeds to step S403.

In step S403, it is determined whether there is a facial image.

If a negative result is obtained in step S403, i.e., there is no facial image in the monitoring image, then the process proceeds to step S401, so as to continuously capture a monitoring image of the object to be detected and execute monitoring.

Contrarily, if a positive result is obtained in step S403, i.e., there is a facial image (corresponding to the facial image data $I_1$) in the monitoring image, then the process proceeds to step S404. It needs to be noted that, in the case where even there is a facial image in the monitoring image, the facial image may probably be an image of an attacker like face mask or 3D face model and so on, thus liveness detection needs to be further performed.

In step S404, the structured light source module 21 is turned on for emitting structured light to irradiate an object to be detected. Thereafter, the process proceeds to step S405.

In step S405, first facial image data of the object to be detected under irradiation of the structured light is obtained. The first facial image data $I_2$ of the object to be detected under irradiation of the structured light is obtained by the image data obtaining module 22. In an embodiment of the present disclosure, the structured light source module 21 may be turned off after obtaining the first facial image data $I_2$. Thereafter, the process proceeds to step S406.

In step S406, a plurality of predetermined facial key points on the first facial image data is determined. As described above with reference to FIG. 3B, the facial key point detecting unit 232 that is trained in advance is used to determine a plurality of predetermined facial key points on the first facial image data, the key points include, but not limited to, eyes, nose, mouth, contour etc. Thereafter, the process proceeds to step S407.

In step S407, a predetermined region is determined according to the plurality of predetermined facial key points. As described above with reference to FIG. 3B, in the first embodiment of the present disclosure, the predetermined region D (x, y) is within the range of $x_0 \leq x \leq x_1$, $y_0 \leq y \leq y_1$, wherein $x_0$, $x_1$ are horizontal coordinates of leftmost and rightmost sites of the face on the image, respectively, $y_0$ is a vertical coordinate of the lowest site on the face, $y_1$ is vertical coordinates of sites of a center between two eyes and a midpoint of the nose. Thereafter, the process proceeds to step S408.

In step S408, a ratio of a sum of gradient magnitudes of the first facial image data within the predetermined region to a total brightness value of the image within the predetermined region is obtained as the detection parameter, wherein the detection parameter indicates a sub-surface scattering intensity of the structured light on a face of the object to be detected.

Specifically, a gradient magnitude $I_{2\_m}$ of the first facial image 12 is calculated by using the following Equation (1):

$$I_{2\_m}(i,j) = \sqrt{(I_2(i,j)-I_2(i+1,j))^2+(I_2(i,j)-I_2(i,j+1))^2} \quad \text{Equation (1)}$$

where $I_2(i,j)$ indicates a pixel value of the image data $I_2$ at $(i,j)$.

After determining the predetermined region D(x,y) $x_0 \leq x \leq x_1$, $y_0 \leq y \leq y_1$ in step S407, a sum of gradient magnitudes of the first image data $I_2$ in this predetermined region is calculated by using the following Equation (2):

$$M = \sum_{x=x_0}^{x_1} \sum_{y=y_0}^{y_1} \min(T, |I_{2\_m}(i,j)|) \quad \text{Equation (2)}$$

where T is a predetermined threshold parameter. If the pixel value at (i, j) is larger than the threshold parameter T, then the image data of the corresponding pixel (i, j) will be regarded as noise interference such as an edge and so on, as for the pixel (i, j) that is regarded as noise interference, data value of the pixel (i, j) is uniformly set to be the threshold parameter T, and further, a sum M of gradient magnitudes of the first image data $I_2$ in this predetermined region is calculated in combination with the Equation (2).

In addition, a total brightness value of the image within the predetermined region is calculated by using the following Equation (3):

$$B = \sum_{x=x_0}^{x_1} \sum_{y=y_0}^{y_1} (I_2(i,j)-I_1(i,j)) \quad \text{Equation (3)}$$

It should be noted that, in the image total brightness value of the image in the predetermined region as being represented by the shown Equation (3), an image brightness without irradiation of the structured light is subtracted from an image brightness under irradiation of the structured light to obtain an affect caused by the structured light per se on the image brightness.

Further, in the first embodiment of the present disclosure, a ratio of a sum of the gradient magnitudes of the first facial image data within a predetermined region to a total brightness value of the image within the predetermined region is calculated by using the following Equation (4) as the detection parameter u:

$$u = M/B \quad \text{Equation (4)}$$

Thereafter, the process proceeds to step S409.

In step S409, it is determined whether the detection parameter u is larger than a first parameter threshold $TH_1$ and smaller than a second parameter threshold $TH_2$. Magnitude of the detection parameter u reflects a sub-surface scattering intensity of the structured light within the predetermined region. The more intense the sub-surface scattering is, the smaller the image gradient is, accordingly, the smaller the diffusion intensity is. The sub-surface scattering intensity of a mask made typically from paper or plastic and so on is much weaker than that of a human face, while the sub-surface scattering intensity of a mask made typically from silicone and so on is much stronger than that of a human face. That is, if the detection parameter u is smaller than the first threshold parameter of $TH_1$, it indicates that the object to be detected is a mask made of materials such as paper or plastic. If the detection parameter u is larger than the second parameter threshold $TH_2$, it indicates that the object to be detected is a mask made of materials such as silicone. Only when the detection parameter u is between the first parameter threshold TH1 and the second parameter threshold $TH_2$, it indicates that the object to be detected is a face of a living body.

That is to say, if a positive result is obtained in step S409, that is, the detection parameter u falls between the first parameter threshold $TH_1$ and the second parameter threshold $TH_2$, then the process proceeds to step S410, in which it is detected that the object to be detected is a living body.

Contrarily, if a negative result is obtained in step S409, that is, the detection parameter u is smaller than the first parameter threshold $TH_1$ or larger than the second parameter threshold $TH_2$, then the process proceeds to step S411, in which it is detected that the object to be detected is a non-living body.

Figure 5:
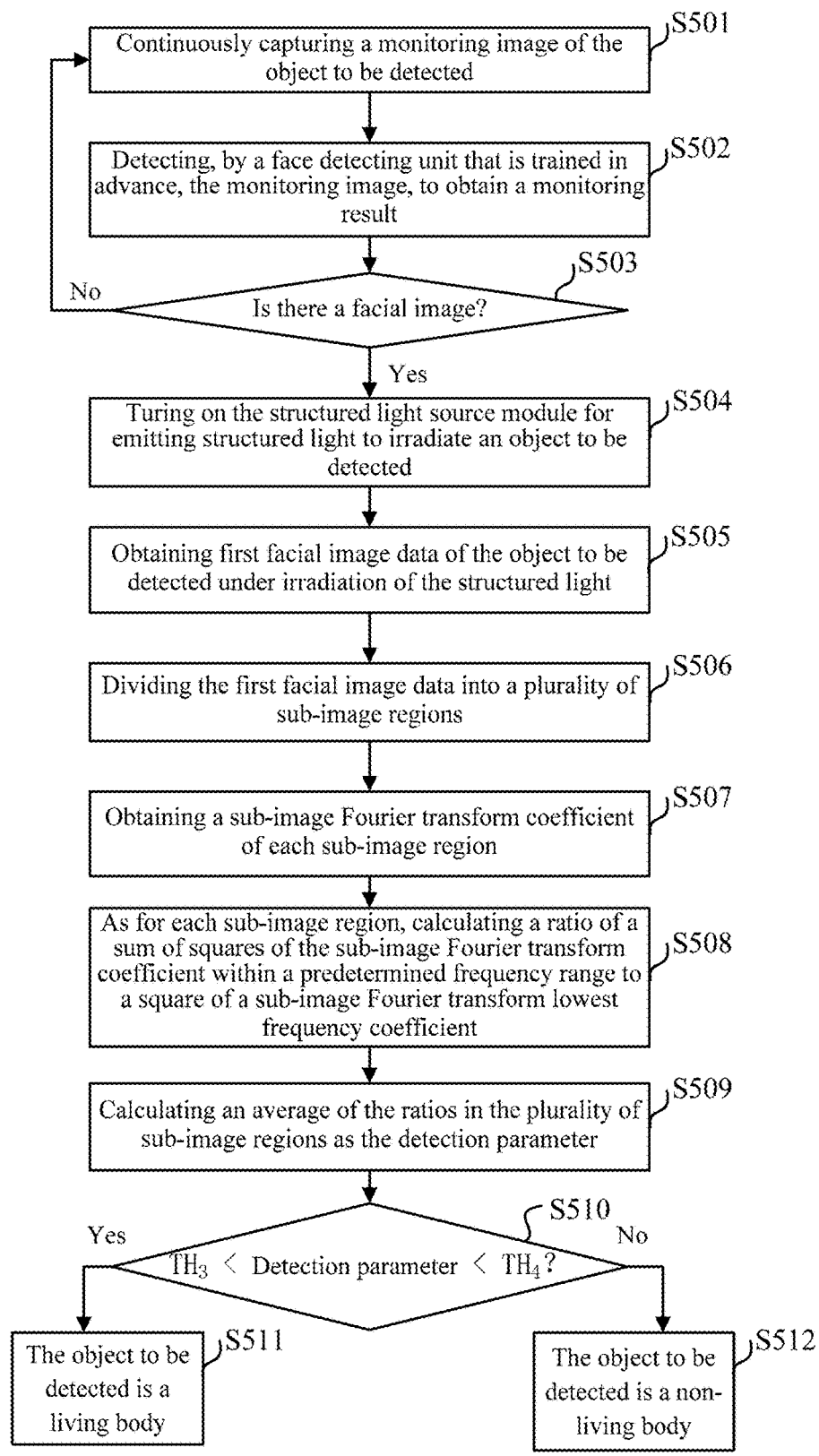
FIG. 5 is a flowchart further illustrating the liveness detection method according to a second embodiment of the present disclosure.

FIG. 5 is a flowchart further illustrating the liveness detection method according to a second embodiment of the present disclosure. As shown in FIG. 5, the liveness detection method according to the second embodiment of the present disclosure comprises the following steps.

Steps S501 to S505 shown in FIG. 5 are the same as steps S401 to S405 described above with reference to FIG. 4, respectively, repetition is omitted here. Thereafter, the process proceeds to step S506.

In step S506, the first facial image data obtained in the preceding steps S501 to S505 is divided into a plurality of sub-image regions. In the second embodiment of the present disclosure, the facial image data is divided into n sub-regions, wherein n is an integer and greater than one. Each of the sub-region has a size of L×L. It is supposed that an image in each sub-region is J. Thereafter, the process proceeds to step S507.

In step S507, a sub-image Fourier transform coefficient of each sub-image region is obtained. In the second embodiment of the present disclosure, a sub-image Fourier transform coefficient of each sub-image region is calculated by performing Fourier transform on sub-image data of each sub-image region using the following Equation (5):

$$f_{p,q} = \sum_{x=0}^{L-1} \sum_{y=0}^{L-1} J_{x,y} e^{2\pi(px+qy)/N} \quad \text{Equation (5)}$$

Thereafter, the process proceeds to step S508.

In step S508, as for each sub-image region, a ratio of a sum of squares of the sub-image Fourier transform coefficient within a predetermined frequency range to a square of a sub-image Fourier transform lowest frequency coefficient is calculated. In the second embodiment of the present disclosure, a ratio of a sum of squares of the sub-image Fourier transform coefficient within a predetermined frequency range to a square of a sub-image Fourier transform lowest frequency coefficient is calculated by using the following Equation (6):

$$u_j = \frac{\sum_{p=0}^{p1} \sum_{q=q1}^{q2} |f_{p,q}|^2}{f_{0,0}^2} \qquad \text{Equation (6)}$$

where p1, q1, 12 are predetermined frequency ranges. Thereafter, the process proceeds to step S509.

In step 509, an average of the ratios in the plurality of sub-image regions is calculated as the detection parameter. In the second embodiment of the present disclosure, the average of the ratios in the plurality of sub-image regions is calculated by using the following Equation (7):

$$u = \frac{\sum_{j=1}^{n} u_j}{n} \qquad \text{Equation (7)}$$

The average of the ratios can be regarded as the detection parameter, in one embodiment.

Thereafter, the process proceeds to step S510.

In step 510, it is determined whether the detection parameter u is larger than a third parameter threshold $TH_3$ and smaller than a fourth parameter threshold $TH_4$. In the second embodiment of the present disclosure, an average of the ratio coefficients within all the sub-image regions is taken as a measurement for the scattering intensity, that is, as the detection parameter. Similar to the first embodiment described above with reference to FIG. 4, if the detection parameter is between the two predetermined thresholds $TH_3$ and $TH_4$, then it is considered that the object to be detected is a living body.

That is to say, if a positive result is obtained in step S510, that is, the detection parameter u falls between the third parameter threshold $TH_3$ and the fourth parameter threshold $TH_4$, then the process proceeds to step S511, in which it is determined that the object to be detected is a living body.

Contrarily, if a negative result is obtained in step S510, that is, the detection parameter u is smaller than the third parameter threshold $TH_3$ or larger than the fourth parameter threshold $TH_4$, then the process proceeds to step S512, in which it is determined that the object to be detected is a non-living body.

Figure 6:
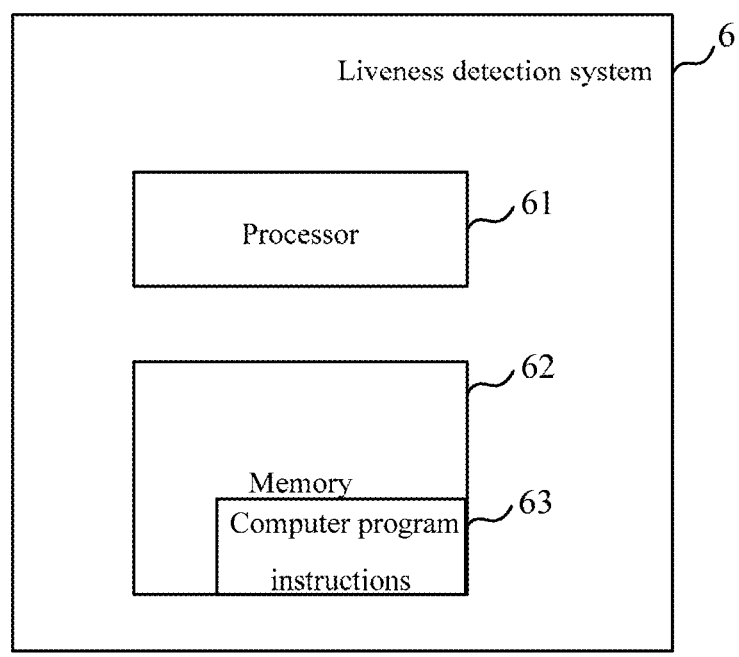
FIG. 6 is a schematic block diagram illustrating the liveness detection system according to an embodiment of the present disclosure.

FIG. 6 is a schematic block diagram illustrating the liveness detection system according to an embodiment of the present disclosure. As shown in FIG. 6, the liveness detection system 6 according to the embodiment of the present disclosure comprises: a processor 61, a memory 62, and computer program instructions 63 stored in the memory 62.

The computer program instructions 63 can achieve functions of respective functional modules of the liveness detection system according to an embodiment of the present disclosure and/or execute respective steps of the liveness detection method according to an embodiment of the present disclosure, when being run by the processor 61.

Specifically, the liveness detection system 6 is enabled to execute the following steps when the computer program instructions 63 are run by the processor 61: obtaining first facial image data of the object to be detected under irradiation of the structured light; determining, based on the first facial image data, a detection parameter that indicates a sub-surface scattering intensity of the structured light on a face of the object to be detected; and determining, based on the detection parameter and a predetermined parameter threshold, whether the object to be detected is a living body.

In addition, the liveness detection system 6 is enabled to further execute the following steps when the computer program instructions 63 are run by the processor 61: prior to irradiating an object to be detected with structured light, continuously capturing a monitoring image of the object to be detected; detecting, by a face detecting unit that is trained in advance, the monitoring image to obtain a monitoring result; when the monitoring result indicates that there is a facial image in the monitoring image, turning on a structured light source to emit the structured light for irradiating the object to be detected.

In addition, the liveness detection system 6 is enabled to further execute the following steps when the computer program instructions 63 are run by the processor 61: determining a plurality of predetermined facial key points on the first facial image data by a facial key point detecting unit that is trained in advance and determining the predetermined region according to the plurality of predetermined facial key points; wherein the detection parameter is a ratio of a sum of gradient magnitudes of the first facial image data within a predetermined region to a total brightness value of the image within the predetermined region.

In addition, the step of determining, based on the first facial image data, a detection parameter that indicates a sub-surface scattering intensity of the structured light on a face of the object to be detected, which the liveness detection system 6 is enabled to execute when the computer program instructions 63 are run by the processor 61 comprises: dividing the first facial image data into a plurality of sub-image regions; performing Fourier transform on sub-image data of each sub-image region to obtain a sub-image Fourier transform coefficient of each sub-image region; as for each sub-image region, calculating a ratio of a sum of squares of the sub-image Fourier transform coefficient within a predetermined frequency range to a square of a sub-image Fourier transform lowest frequency coefficient; and calculating an average of the ratios in the plurality of sub-image regions as the detection parameter.

In addition, the step of determining, based on the detection parameter and a predetermined parameter threshold, whether the object to be detected is a living body, which the liveness detection system 6 is enabled to execute when the computer program instructions 63 are run by the processor 61 comprises: if the detection parameter is larger than a first parameter threshold and smaller than a second parameter threshold, determining that the object to be detected passes the liveness detection; otherwise, determining that the object to be detected fails the liveness detection.

Respective modules in the liveness detection system according to an embodiment of the present disclosure may be implemented by the processor in the liveness detection system according to an embodiment of the present disclosure running the computer program instructions stored in the memory, or may be implemented by the computer program instructions stored in the computer-readable storage medium of the computer program product according to an embodiment of the present disclosure and run by a computer.

The computer-readable storage medium may be any combination of one or more computer-readable storage mediums, e.g., one computer-readable storage medium containing computer-readable program codes for determining a detection parameter that indicates a sub-surface scattering intensity of the structured light on a face of the object to be detected, and another computer-readable storage medium containing computer-readable program codes for determining whether the object to be detected is a living body.

The computer-readable storage medium may for example include a memory card of a smart phone, a storage unit of a tablet computer, a hard disk of a personal computer, a random access memory (RAM), a read only memory (ROM), an erasable programmable read-only memory (EPROM), a portable compact disc read-only memory (CD-ROM), a USB memory, or a combination of any the aforesaid storage mediums.

Exemplary embodiments of the present disclosure as described in detail in the above are merely illustrative, rather than limitative. However, those skilled in the art should understand that, various modifications, combinations or sub-combinations may be made to these embodiments without departing from the principles and spirits of the present disclosure, and such modifications are intended to fall within the scope of the present disclosure.

What is claimed is:

1. A liveness detection method, comprising:
    irradiating an object to be detected with structured light;
    obtaining first facial image data of the object to be detected under irradiation of the structured light;
    determining, based on the first facial image data, a detection parameter that indicates a sub-surface scattering intensity of the structured light on a face of the object to be detected; and
    determining, based on the detection parameter and a predetermined parameter threshold, whether the object to be detected is a living body,
    wherein the detection parameter is a ratio of a sum of gradient magnitudes of the first facial image data within a predetermined region to a total brightness value of the image within the predetermined region, or
    wherein determining, based on the first facial image data, a detection parameter that indicates a sub-surface scattering intensity of the structured light on a face of the object to be detected comprises:
        dividing the first facial image data into a plurality of sub-image regions;
        performing Fourier transform on sub-image data of each sub-image region to obtain a sub-image Fourier transform coefficient of each sub-image region;
        as for each sub-image region, calculating a ratio of a sum of squares of the sub-image Fourier transform coefficient within a predetermined frequency range to a square of a sub-image Fourier transform lowest frequency coefficient; and
        calculating an average of the ratios in the plurality of sub-image regions as the detection parameter.

2. The liveness detection method according to claim 1, further comprising:
    prior to irradiating an object to be detected with structured light, continuously capturing a monitoring image of the object to be detected;
    detecting, by a face detecting unit that is trained in advance, the monitoring image to obtain a monitoring result;
    when the monitoring result indicates that there is a facial image in the monitoring image, turning on a structured light source to emit the structured light for irradiating the object to be detected.

3. The liveness detection method according to claim 1, wherein when the detection parameter is the ratio of the sum of gradient magnitudes of the first facial image data within the predetermined region to the total brightness value of the image within the predetermined region, the method further comprises:
    determining a plurality of predetermined facial key points on the first facial image data by a facial key point detecting unit that is trained in advance, and determining the predetermined region according to the plurality of predetermined facial key points.

4. The liveness detection method according to claim 1, wherein determining, based on the detection parameter and a predetermined parameter threshold, whether the object to be detected is a living body comprises:
    if the detection parameter is larger than a first parameter threshold and smaller than a second parameter threshold, determining that the object to be detected passes the liveness detection;
    otherwise, determining that the object to be detected fails the liveness detection.

5. A liveness detection system, comprising:
    a structured light source module for emitting structured light to irradiate an object to be detected;
    an image data obtaining module for obtaining first facial image data of the object to be detected under irradiation of the structured light; and
    a liveness detecting module for determining, based on the first facial image data, a detection parameter that indicates a sub-surface scattering intensity of the structured light on a face of the object to be detected, and determining, based on the detection parameter and a predetermined parameter threshold, whether the object to be detected is a living body,
    wherein the detection parameter is a ratio of a sum of gradient magnitudes of the first facial image data within a predetermined region to a total brightness value of the image within the predetermined region, or
    wherein the liveness detecting module divides the first facial image data into a plurality of sub-image regions; performs Fourier transform on sub-image data of each sub-image region to obtain a sub-image Fourier transform coefficient of each sub-image region; as for each sub-image region, calculates a ratio of a sum of squares of the sub-image Fourier transform coefficient within a predetermined frequency range to a square of a sub-image Fourier transform lowest frequency coefficient and calculates an average of the ratios in the plurality of sub-image regions as the detection parameter.

6. The liveness detection system according to claim 5, wherein prior to the structured light source module emits structured light to irradiate an object to be detected, the image data obtaining module continuously captures a monitoring image of the object to be detected;
    the liveness detecting module detects, by a face detecting unit that is trained in advance, the monitoring image to obtain a monitoring result;
    when the monitoring result indicates that there is a facial image in the monitoring image, the liveness detecting module turns on the structured light source module to emit the structured light for irradiating the object to be detected.

7. The liveness detection system according to claim 5, wherein when the detection parameter is the ratio of the sum of gradient magnitudes of the first facial image data within the predetermined region to the total brightness value of the image within the predetermined region, the liveness detecting module determines, by a facial key point detecting unit that is trained in advance, a plurality of predetermined facial key points on the first facial image data, and determines the predetermined region according to the plurality of predetermined facial key points.

8. The liveness detection system according to claim 5, wherein if the detection parameter is larger than a first parameter threshold and smaller than a second parameter threshold, the liveness detecting module determines that the object to be detected passes the liveness detection;

otherwise, the liveness detecting module determines that the object to be detected fails the liveness detection.

9. A liveness detection device, comprising:
a processor;
a memory; and
computer program instructions stored in the memory and when run by the processor, configured to cause the liveness detection device to perform a liveness detection method comprising the following steps:
irradiating an object to be detected with structured light;
obtaining first facial image data of the object to be detected under irradiation of the structured light;
determining, based on the first facial image data, a detection parameter that indicates a sub-surface scattering intensity of the structured light on a face of the object to be detected; and
determining, based on the detection parameter and a predetermined parameter threshold, whether the object to be detected is a living body,
wherein the detection parameter is a ratio of a sum of gradient magnitudes of the first facial image data within a predetermined region to a total brightness value of the image within the predetermined region, or
wherein the step of determining, based on the first facial image data, a detection parameter that indicates a sub-surface scattering intensity of the structured light on a face of the object to be detected performed by the liveness detection device caused by the computer program instructions run by the processor comprises:
dividing the first facial image data into a plurality of sub-image regions;
performing Fourier transform on sub-image data of each sub-image region to obtain a sub-image Fourier transform coefficient of each sub-image region;
as for each sub-image region, calculating a ratio of a sum of squares the sub-image Fourier transform coefficient within a predetermined frequency range to a square of a sub-image Fourier transform lowest frequency coefficient; and
calculating an average of the ratios in the plurality of sub-image regions as the detection parameter.

10. The liveness detection device as claimed in claim 9, wherein when the computer program instructions are run by the processor, the liveness detection device is caused to perform the step of:
prior to irradiating an object to be detected with structured light, continuously capturing a monitoring image of the object to be detected;
detecting, by a face detecting unit that is trained in advance, the monitoring image to obtain a monitoring result;
when the monitoring result indicates that there is a facial image in the monitoring image, turning on a structured light source to emit the structured light for irradiating the object to be detected.

11. The liveness detection device as claimed in claim 9, wherein when the detection parameter is the ratio of the sum of gradient magnitudes of the first facial image data within the predetermined region to the total brightness value of the image within the predetermined region, and when the computer program instructions are run by the processor, the liveness detection device is caused to perform the step of:
determining a plurality of predetermined facial key points on the first facial image data by a facial key point detecting unit that is trained in advance and determining the predetermined region according to the plurality of predetermined facial key points.

12. The liveness detection device according to claim 9, wherein the step of determining, based on the detection parameter and a predetermined parameter threshold, whether the object to be detected is a living body performed by the liveness detection device caused by the computer program instructions run by the processor comprises:
if the detection parameter is larger than a first parameter threshold and smaller than a second parameter threshold, determining that the object to be detected passes the liveness detection;
otherwise, determining that the object to be detected fails the liveness detection.

* * * * *